United States Patent [19]

Torradas et al.

[11] Patent Number: 5,399,619
[45] Date of Patent: Mar. 21, 1995

[54] LAMINAR ARTICLES FROM A POLYOLEFIN MATRIX, ETHYLENE-VINYL ALCOHOL COPOLYMERS AND A COMPATIBILIZER

[75] Inventors: Jose M. Torradas, Chadds Ford, Pa.; Robert W. Scott, Wilmington, Del.

[73] Assignee: E. I. Du Pont de Nemours and Company, Wilmington, Del.

[21] Appl. No.: 109,373

[22] Filed: Aug. 24, 1993

[51] Int. Cl.⁶ ............... C08L 29/04; C08L 23/08
[52] U.S. Cl. ................... 525/57; 525/240; 525/221; 525/227; 428/500; 428/523
[58] Field of Search ........... 525/57, 240, 227, 221; 428/500, 523

[56] References Cited

U.S. PATENT DOCUMENTS

| | | | |
|---|---|---|---|
| 3,975,463 | 8/1976 | Hirata et al. | 260/897 |
| 4,182,457 | 1/1980 | Yamada et al. | 215/1 |
| 4,217,161 | 8/1980 | Yamada et al. | 156/242 |
| 4,261,473 | 4/1981 | Yamada et al. | 215/1 C |
| 4,410,482 | 10/1983 | Subramanian | 264/515 |
| 4,444,817 | 4/1984 | Subramanian | 428/36 |
| 4,451,512 | 5/1984 | Yazaki et al. | 428/36 |
| 4,511,610 | 4/1985 | Yazaki et al. | 428/35 |
| 4,528,219 | 1/1984 | Yamada et al. | 428/35 |
| 4,548,985 | 10/1985 | Yazaki et al. | 525/65 |
| 4,948,671 | 5/1989 | Hattori et al. | 428/411.1 |
| 4,971,864 | 11/1990 | McCord | 428/516 |
| 5,202,074 | 4/1993 | Schrenk et al. | 264/241 |

FOREIGN PATENT DOCUMENTS

| | | |
|---|---|---|
| 0365211 | 12/1989 | European Pat. Off. . |
| 52-28144 | 7/1977 | Japan . |
| WO9011-326 | 10/1990 | WIPO . |

*Primary Examiner*—W. Robinson Clark

[57] ABSTRACT

The laminar article of the invention comprises a mixture of a polyolefin matrix with a barrier resin of polyethylene-vinyl alcohol copolymer and a compatibilizer selected from an ethylene-ethylenically unsaturated carboxylic acid copolymer such as ethylene methacrylic acid or ethylene acrylic acid, ethylene vinyl acetate, polyethylene vinyl alcohol or mixtures thereof. A process is also claimed for preparing a laminar article with multiple thin, overlapping layers, comprising preparing a melted heterogeneous blend of a polyolefin, an ethylene-vinyl alcohol copolymer, and the above compatibilizer; extending the body of the melt; and cooling the extended body to below the melting point of the polyolefin.

15 Claims, No Drawings

LAMINAR ARTICLES FROM A POLYOLEFIN MATRIX, ETHYLENE-VINYL ALCOHOL COPOLYMERS AND A COMPATIBILIZER

BACKGROUND OF THE INVENTION

This invention relates to laminar blends of polyolefins and ethylene-vinyl alcohol copolymers which have superior barrier and physical properties.

Polyolefins have been broadly used as packaging materials for foodstuffs and the like because of excellent mechanical strength and sanitariness. However, polyolefins disadvantageously permit high permeability of gases such as oxygen and carbon dioxide. As a result, foodstuffs cannot be preserved for a long time with use of containers or the like formed of polyolefins.

Containers and films which are blends or laminates of polyolefins and ethylene-vinyl alcohol copolymers have been the subject of several investigations because this combination of polymers has the potential for providing high resistance to permeation by water, oxygen and hydrocarbons.

U.S. Pat. No. 3,975,463 discloses a molded structure having a specific multilayer structure and good resistance to gas permeation made from (a) 30 to 98% by weight of a crystalline polyolefin, (b) 2 to 70% by weight of a saponified product of an ethylene vinyl acetate copolymer, and (c) 0.5 to 15 parts by weight of a thermoplastic polymer containing a carbonyl group in the main or side chain. The thermoplastic polymer (c) can be a copolymer of maleic anhydride or an acrylic acid grafted polyethylene.

Prior art laminar articles were found to exhibit significant variation in resistance to permeation by hydrocarbons, water and/or oxygen and in mechanical strength. Such variations are undesirable in laminar structures which are to be used in applications such as containers for hydrocarbon fuels and packaging for perishable foodstuffs. In addition, the components used in laminar articles to be used as containers for foodstuffs often must be approved by the United States Food and Drug Administration or other regulatory authorities. Thus, a need exists to provide polyolefin/ethylene-vinyl alcohol copolymer laminar structures which will consistently provide optimum barrier properties and mechanical strength, and which are approved for use as a container for foodstuffs.

SUMMARY OF THE INVENTION

The inventive laminar articles consistently exhibit outstanding barrier properties toward oxygen have good mechanical properties and are suitable for use as food containers.

Specifically, the present invention provides a laminar article comprising the following:
(a) a polyolefin;
(b) an ethylene-vinyl alcohol copolymer containing about 20–60 mole % of ethylene units, said copolymer having a melting point at least about 5° C. higher than said polyolefin; and,
(c) a compatibilizer comprising polyethylene methacrylic acid, polyethylene acrylic acid, polyethylene vinyl acetate, polyethylene vinyl alcohol or mixtures thereof.

The quantity of polyolefin (a) being about 60 to about 98 by weight, the quantity of ethylene-vinyl alcohol copolymer (b) being about 2-20% by weight, both based on the total weight of (a), (b), and (c), and the quantity of compatibilizer (c) being about 0.15 to 20 parts by weight based on the total weight of (a), (b) and (c).

The present invention further provides a process for manufacturing a laminar, shaped article comprising the steps of:
(a) establishing a melted, heterogeneous blend of (i) polyolefin, (ii) an ethylene-vinyl alcohol copolymer containing about 20–60 mole % of ethylene units and having a melting point at least about 5° C. higher than the polyolefin, and (iii) a compatibilizer comprising a copolymer of ethylene and an ethyleneically unsaturated carboxylic acid, polyethylene vinyl acetate, polyethylene vinyl alcohol or mixtures thereof;
(b) extending a body of the melt; and
(c) cooling the extended body to below the melting point of the polyolefin.

DETAILED DESCRIPTION OF THE INVENTION

The polyolefin (a) used in preparing the laminar articles of this invention includes polyethylene, polypropylene, polybutylene, and related copolymers. Polyethylene is preferred and may be high, medium, low or linear low density material.

Component (b) is an ethylene-vinyl alcohol copolymer containing about 20 to about 60 mole % of ethylene, which copolymer is further characterized by having a melting point at least about 5° C. greater than polyolefin (a). The ethylene-vinyl alcohol copolymer used in the present invention is considered to be a separate element of the composition from the polyolefin element. Copolymers of ethylene and vinyl alcohol suitable for use in the present invention can be prepared by the methods disclosed in U.S. Pat. Nos. 3,510,464; 3,560,461; 3,847,845; and 3,585,177. Preferably, the ethylene-vinyl alcohol copolymer has a melting point at least about 10° C. greater than polyolefin (a). For higher melting polyolefins, the requirement that the copolymer be higher melting than the polyolefin may limit the amount of ethylene which may be present in the ethylene-vinyl alcohol copolymer to less than 60 mole %. For example, when using polypropylene having a melting point of about 168° C., ethylene-vinyl alcohol containing greater than about 38% by weight of ethylene may not be useful because such copolymers have melting points which are around or below 168° C.

As is well known to those skilled in the art, the required ethylene-vinyl alcohol copolymers are prepared by saponification of ethylene-vinyl acetate copolymers. For use in the present invention, the degree of saponification should be greater than about 95% and preferably at least 99%. Typically these copolymers have number average molecular weights of about 20,000 to 80,000, but their molecular weight is not directly critical to this invention. As will be described in detail hereinafter, it is preferred that the melt viscosity of the ethylene-vinyl alcohol copolymer be 1.1 to 3.5 times greater than the melt viscosity of the polyolefin at the temperature at which the laminar articles are formed. Therefore, only to the extent that molecular weight is related to melt viscosity is the molecular weight of the ethylene-vinyl alcohol copolymer significant. It may be possible to blend an ethylene-vinyl alcohol copolymer saponified product with other rubbery polymer as described in U.S. Pat. No. 3,975,463. For example, an ethylene-propylene copolymer, a polyisobutylene, a chlorosulfonated polyethylene, a polyisoprene, a polysulfurized rubber, a polychloroprene or a styrene-butadiene copolymer may be blended. It may also be possible to blend an ethylene-vinyl alcohol copolymer saponified product with one or more condensation polymers, preferably one which is incompatible with the polyolefin, such as polyesters, polycarbonates or polyamides (such as Nylon 6, Nylon 66, or copolymers or an amorphous polyamide). Suitable condensation polymers are described in U.S. Pat. Nos. 4,410,482 and 4,416,942.

Component (c), the compatibilizer, is a copolymer of ethylene and an ethylenically unsaturated carboxylic acid, polyethylene vinyl acetate, polyethylene vinyl alcohol or mixtures thereof. By compatibilizer it is meant that the ethylene copolymer enables the polyolefin and the ethylene-vinyl alcohol barrier resin to be blended to form an integral structure without significant delaminations, voids, or other structural defects which may adversely affect the physical properties and barrier properties. The compatibilizer is believed to promote interpolymer or interfacial bonding between the polyolefin and the barrier resin. Typically ethylene-vinyl alcohol barrier resins and polyolefins are considered to be incompatible polymers. It is also believed that the compatibilizer of the present invention contributes to improved barrier properties. It is believed that the compatibilizer serves to adhere adjacent layers of polyolefin and ethylene-vinyl alcohol copolymer to one another.

The copolymer of ethylene and an $\alpha,\beta$ ethylenically unsaturated carboxylic acid is of the formulation E/X/Y, where E is ethylene, X is a carboxylic acid containing 3 to 8 carbon atoms, and Y is an optional alkyl acrylate, alkyl methacrylate, alkyl vinyl ether, carbon monoxide, sulfur dioxide, vinyl acetate, or mixtures thereof, where alkyl groups are 1–12 carbon atoms. Preferably, E is at least 50 weight % of E/X/Y,
X is 1–35 weight % of E/X/Y, and
Y is 0–49 weight % of E/X/Y.

Specific ethylene-acid copolymers include ethylene/acrylic acid, ethylene/methacrylic acid, ethylene/acrylic acid/n-butyl acrylate, ethylene/methacrylic acid/n-butyl acrylate, ethylene/methacrylic acid/isobutyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrlic acid/methyl acrylate, ethylene/methacrylic acid/methyl methacrylate, and ethylene/acrylic acid/n-butyl methacrylate.

Preferred ethylene-acid copolymers include ethylene/methacrylic acid, ethylene/acrylic acid, ethylene /methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred ethylene-acid copolymers are ethylene/methacrylic acid, and ethylene/acrylic acid copolymers.

In preparing the laminar articles of this invention, the ethylene-vinyl alcohol copolymer, which provides the discontinuous phase, is used in amounts of about 1–20% by weight, preferably about 5–15% by weight, based on the total weight of components (a), (b) and (c). Articles containing less than about 2% by weight of copolymer generally do not exhibit sufficient improvement in barrier properties toward oxygen or hydrocarbons to be useful commercially. Articles containing greater than about 20% by weight of ethylene-vinyl alcohol copolymer exhibit no significant improvement in barrier properties and may adversely effect mechanical properties of the article.

The amount of compatibilizer required to prepare the laminar articles of this invention, among other things, is a function of (i) the concentration of ethylene-vinyl alcohol copolymer in the article (ii) the type of polyolefin and (iii) the particular compatibilizer used. For example, the greater the concentration of ethylene-vinyl alcohol copolymer, in general the greater the amount of compatibilizer that is required in order to provide sufficient adhesion between adjacent layers of polyolefin and ethylene-vinyl alcohol copolymer. In addition, higher concentrations of compatibilizer may be desirable to provide increased stiffness to polyolefins such as low density polyethylene.

The amount of polyolefin component (a) used in the articles of this invention is clearly 100% by weight less the sum of the percentages of components (b) and (c) (not counting any additional amounts of pigments, plasticizers, nucleating agents or other conventional additives, fillers, etc., which may be used). It is preferable that the concentration of polyolefin not be less than 60% by weight and more preferable that it not be less than 70% by weight based on the total weight of the three components.

The articles of the present invention are prepared substantially by the process described in U.S. Pat. No. 4,410,482, which is incorporated herein by reference. The laminated articles are preferably made by mixing together particles of the polyolefin, particles of the polyethylene-vinyl alcohol copolymer and particles of the compatibilizer, heating the mixture to yield a heterogeneous melt of material and forming the melt in a way which results in extending the melt to yield multiple elongated discontinuous polymer domains of the ethylene-vinyl alcohol copolymer within a continuous domain of polyolefin. As used herein, the term "extending the melt" means that a given volume of melt is shaped by means which significantly increase its surface area, such as the extension which would occur when the melt is squeezed by rollers, pressed between platens, extended between die lips or inflated during blow molding.

In one embodiment, the polymer particles, (components (a), (b), and (c)) in unmelted form are mixed thoroughly so as to provide a substantially homogenous distribution. The dry mix is then fed to a single-screw extruder, for example, where upon heating, the polyolefin and compatibilizer melt first. The melt temperature of the blend must be below the melting point of the polyethylene-vinyl alcohol copolymer barrier resin. As such, the particles of polyethylene-vinyl alcohol copolymer may soften and elongate to form platelets or layers. Care must be exercised to avoid substantial additional mixing once the platelets or layers are formed. The blend can also be established by combining molten polyolefin with solid particles of ethylene-vinyl alcohol copolymer and compatibilizer and then heating the combination. The success of the invention generally depends on establishing a melted heterogeneous blend of polymers which, when extended; e.g., by extrusion, yields an article in which one polymer is in the form of a continuous matrix phase and the other polymer is in the form of a discontinuous distributed phase. The polymer comprising the discontinuous phase is present as a multitude of thin parallel and overlapping layers embedded in the continuous phase.

Although it is not required, it is preferred that both the polyolefin and the polyethylene-vinyl alcohol copolymer should be mixed as particles. The particles should, as a general rule, be of a size such that the molten blend of incompatible polymers, when introduced to some melt extension means, such as extrusion die lips, exhibit the heterogeneity necessary for practice of the invention. When the particles, especially particles of the copolymer, are of too small in size, the melted blend, even though not excessively mixed, tends to function as a homogeneous composition because the domains of material making up the discontinuous polymer phase are so small. When the particles, especially particles of the copolymer, are of too large in size, the melt blend tends to form into shaped articles having a marbleized structure rather than a laminar structure. In such cases, the large domains of the materials which would make up the discontinuous phase extending to opposite boundaries of the shaped articles and causing disruption of the polyolefin which would make up the continuous phase. Particles about 1–7 mm, preferably about 2–4 mm on a side, are particularly well suited. The particles are preferably generally regular in shape, such as cubical or cylindrical or the like. The particles may, however, be irregular; and they may have one or two dimensions substantially greater than other dimension such as would be the case, for example, when flakes of material are used.

When each of the incompatible polymers is present as individual particles, the particles are preferably of approximately the same size, although this is not required. The compatibilizer can be provided by itself as individual particles, or it can be mixed into, coated onto, or otherwise combined with the polyolefin or the ethylene-vinyl copolymer. It is preferred not to melt blend the compatibilizer directly with the ethylene-vinyl alcohol copolymer prior to making the laminar articles, because the compatibilizer may cause gellation or crosslinking of the ethylene-vinyl alcohol copolymer when so blended. In order to ensure that the compatibilizer is well distributed in the final blend, it is sometimes desirable to supply the compatibilizer in a powdered, rather than a pelletized form.

The thickness of the layers of material in the discontinuous phase is generally a function of the particle size combined with the degree of extension in the forming step. The particle size of the melt blend which will be the discontinuous phase is generally selected with a view toward obtaining, after extension, overlapping layers which can be from about 0.1 to 60 micrometers thick or perhaps slightly thicker.

Dry mixing particles of the polymers can be accomplished by any well-known means such as by means of a V-blender or a tumble mixer or, on a larger scale, by means of a double-cone blender. Continuous mixing of the particles can be accomplished by any of several well-known methods. Of course, the particles can also be mixed by hand, the only requirement of the mixing being that any two statistical samplings of the mixture in a given mass of material should yield substantially the same composition. The mixing of the incompatible polymers can also be accomplished by adding particles of the higher melting copolymer to a melt of the lower melting polyolefin maintained at a temperature below the higher melting point. In that case, the melt is agitated to obtain an adequate mixture; and the mixture is, thus, ready for the final heating step.

Once mixed, the incompatible polymers are ultimately heated to a temperature greater than the melting of the higher melting ethylene-vinyl alcohol copolymer. The heating yields a molten heterogeneous blend of materials which is ready for the stretching step of the process. The heating must be conducted in a manner which avoids substantial additional mixing of the incompatible polymers because such mixing could cause homogenization and could result in a melt and a shaped article of substantially uniform, unlayered structure. The heating can be conducted by any of several well-known means and is usually conducted in an extruder. A single-screw extruder of the type which is designed for material transport rather than material mixing can be used for the heating step and for transporting material to the forming steps of this process without causing homogenization of the molten two-phase polymer composition. Low shear and low mixing extruders of the kind normally used for polyvinyl chloride, acrylonitrile, or polyvinylidene chloride can be used to prepare the articles of this invention if they are used in a way to melt and transport the materials while minimizing mixing of the components. High shear and high mixing extruders of the kind normally used for nylon and polyethylene should generally not be used.

The forming step requires extension of the molten blend followed by cooling. Melt extension can be accomplished by any of several means. For example, the melt can be extended by being squeezed between rollers, pressed between platens or extruded between die lips. Molding processes such as blow molding also cause extension in accordance with this process. In the manufacture of shaped articles such as containers, the extension can be accomplished by a combination of extruding a blend of the heterogeneous melt to yield a container preform or parison followed by blow molding the parison into a finished container.

The extension or melt forming can be in a single direction or in perpendicular directions. Whether the forming is conducted in one direction or two, there should be an elongation of from about 10 to 500 or even 1000 percent or more in at least one direction; an elongation of about 100 to about 300 percent is preferred. Avoidance of excessive extension is important only insofar as excessive elongation of the melt may lead to weakening or rupture of the article.

Melt extension or forming is followed by cooling to below the temperature of the melting point of the polyolefin to solidify the shaped article. The cooling can be conducted by any desired means and at any convenient rate. In the case of extension by blow molding, the mold is often chilled to cool the article; and, in the case of extruding a film, cooling can be accomplished by exposure to cool air or by contact with a quenching roll.

In the actual step in which extension of the melt occurs so as to form the laminar articles of this invention, the temperature of the melt is preferably 5°–15° C. greater than the melting point of the higher melting ethylene-vinyl alcohol copolymer. Higher temperatures tend to lower the melt viscosities of the incompatible polymers which in turn may facilitate homogenization which is to be avoided.

Laminar articles prepared by extension of the molten polymer blends used in this invention generally have better properties if the melt viscosity of the ethylene-vinyl alcohol copolymer is somewhat greater than the melt viscosity of the polyolefin, both viscosities being measured at about the temperature at which forming occurs. Preferably, the melt viscosity of the ethylene-vinyl alcohol copolymer should be from 1.1 to 3.5 times greater than the melt viscosity of the polyolefin.

The laminar articles of the present invention exhibit low permeability to ordinary gases such as oxygen and provide excellent mechanical properties such as impact resistance and physical properties such as translucence, surface smoothness and uniformity. Such laminar articles have excellent processibility and may advantageously be formed into containers for a wide variety of materials such as hydrocarbons (including fuel), or other organic compounds or foodstuffs, particularly packaging materials for foodstuffs or the like, such as films, bags, bottles and tubes.

EXAMPLES

A series of fourteen dry blends were prepared containing a polyolefin matrix of High Density Polyethylene ("HDPE") and/or Low Density Polyethylene ("LDPE"), a polyethylene vinyl alcohol resin and different compatibilizers. The concentrations for the blend components are shown in Table 1. For example, Examples 1 and 2 shown in Table 1 are control examples. Example 1 has no barrier resin and no compatibilizer. Example 2 has no compatibilizer.

The polyethylene vinyl alcohol barrier resin ("EVOH") used (SELAR OH BX-220, commercially available from E. I. du Pont de Nemours and Company) contains 32% by weight of ethylene, a melt flow index of 3 g/10 min (ASTM D-1238) and a melting point of 184° C.

The HDPE used (HiD 9416 commercially available from Chevron) is a homopolymer with a density of 0.964 gm/cc and a melt flow index of 0.7 gm/10 min. (ASTM D-1238) and a melting point of 131° C. The LDPE used (commercially available from Chevron) is a homopolymer with a density of 0.926 gm/cc, a melt flow index of 20 gm/10 min. (ASTM D-1238) and a melting point of 110° C. These resins were blended at a 60/40 wt/wt ratio in all the blends in Examples 1–6 and a 50/50 wt/wt ratio in all blends in Examples 12–14.

The compatibilizers used in the Examples are as follows:

A) NUCREL® 0903—an ethylene methacrylic acid copolymer (commercially available from E. I. du Pont de Nemours and Company) (Examples 3, 8–10, 13 and 14) with 9.0% Methacrylic Acid, a melt flow index of 0.25 gm/min (ASTM D-1238), and a melting point of 101° C.;

B) ELVAX® 3170—an ethyl-vinyl acetate copolymer (commercially available from E. I. du Pont de Nemours and Company) (Example 4) with 18% wt. of Vinyl Acetate, a melt flow index of 0.25 gr/min, a melting point of 84° C., and a density of 0.940 gr/cc.;

C) PRIMACOR® 1410 XT—an ethylene-acrylic acid copolymer (commercially available from Dow Chemical Company) (Example 5) with a melt flow index of 0.15 g/min (ASTM D-1238), a melting point of 84° C. and a density of 0.938; and D) SELAR® OH BX-228—an ethylene vinyl alcohol copolymer (commercially available from E. I. du Pont de Nemours and Company) (Example 6) with 44% wt. of ethylene, a melt flow index of 12 gr/10 min. (ASTM D-1238) and a melting point of 168° C.

The laminar bottles (1 liter, 50 gr/bottle, 0.8 mm of side wall thickness) were produced in a Extrusion Blow Molding Machine (BEKUM H1215, 24:1 L/D) following the teachings of U.S. Pat. No. 4,971,864. The total weight of the extruded bottle is reported in Table 1.

Bottles made from the blends in Examples 1–10 were evaluated in terms of solvent barrier to xylene (weight loss in an oven at 50° C. during 14 days or 8 days) (ASTM D2684). The average solvent losses in sets of 4 bottles/blend are summarized in Table 1. The permeation results for Examples 3–6 are superior to those of Example 2 (no compatibilizer) and show a tenfold improvement compared to Example 1 (no barrier resin and no compatibilizer).

Examples 7–10 illustrate the effect of the concentration of the barrier resin and compatibilizer on the solvent and oxygen barrier for laminar bottles made with blends of LDPE, EVOH and a ethylene methacrylic acid copolymer compatibilizer.

The Oxygen Permeation Values (OPV) were measured in properly sealed bottles using an Ox-Tran 1000. The test results measured at 24° C. and a 40% R.H. are reported in Table 1.

Examples 7–10 illustrate how the barrier to solvents and to oxygen improves when the concentration of EVOH/Compatibilizer is at a ratio of about 3:1. Example 7 is a control blend with LDPE and no barrier resin or compatibilizer. The presence of a compatibilizer affects the quality of the solvent barrier to a larger extent than the oxygen barrier.

Examples 12–14 illustrate the effect of bottle weight and matrix compositon for blends containing a 50/50 blend of HDPE/LDPE as the matrix, EVOH and the same compatibilizer resin described in Examples 8–10. Example 12 is a control blend without EVOH.

These bottles were made with a Rocheleau extrusion blow molding machine. The bottles in Examples 12–14 have also 1 liter capacity but the weight is 20% lower than in examples 1–11 (40 gr/bottle, 0.65 mm of side wall thickness). The average OPV values measured in sets of 3 bottles are reported in Table 1.

The quality of the barrier in Examples 13 and 14 is excellent despite the decrease in bottle weight versus Examples 1–11.

TABLE 1

| EXAMPLE | TYPE OF POLYOLEFIN MATRIX | WT % POLYOLEFIN MATRIX | WT % EVOH BARRIER RESIN | WT % COMPATIBILIZER | TYPE OF COMPATIBILIZER | TOTAL BOTTLE WEIGHT (GRAMS) | OXYGEN PERMEATION VALUES (CC/DAY/PACKAGE) | XYLENE PERMEATION (% WEIGHT LOSS AFTER 14 DAYS AT 50° C.) | XYLENE PERMEATION (% WEIGHT LOSS AFTER 8 DAYS AT 50° C.) |
|---|---|---|---|---|---|---|---|---|---|
| 1 | HDPE/LDPE (60/40) | 100 | 0 | 0 | — | 51 | — | 25.87 | — |
| 2 | HDPE/LDPE | 92.5 | 7.5 | 0 | — | 51 | — | 2.6 | — |

TABLE 1-continued

| EXAMPLE | TYPE OF POLYOLEFIN MATRIX | WT % POLYOLEFIN MATRIX | WT % EVOH BARRIER RESIN | WT % COMPATIBILIZER | TYPE OF COMPATIBILIZER | TOTAL BOTTLE WEIGHT (GRAMS) | OXYGEN PERMEATION VALUES (CC/DAY/PACKAGE) | XYLENE PERMEATION (% WEIGHT LOSS AFTER 14 DAYS AT 50° C.) | XYLENE PERMEATION (% WEIGHT LOSS AFTER 8 DAYS AT 50° C.) |
|---|---|---|---|---|---|---|---|---|---|
| 3 | HDPE/LDPE (60/40) | 90 | 7.5 | 2.5 | NUCREL 0903 | 51 | — | 1.7 | — |
| 4 | HDPE/LDPE (60/40) | 90 | 7.5 | 2.5 | ELVAX 3170 | 51 | — | 19 | — |
| 5 | HDPE/LDPE (60/40) | 90 | 7.5 | 2.5 | PRIMACOR 1410 | 51 | — | 2.0 | — |
| 6 | HDPE/LDPE (60/40) | 90 | 7.5 | 2.5 | EVOH (44% ET) | 51 | — | 2.0 | — |
| 7 | LDPE | 100 | 0 | 0 | — | 51 | 713.3 | — | 66.7 |
| 8 | LDPE | 95 | 3.75 | 1.25 | NUCREL 0903 | 51 | 0.656 | — | 11.0 |
| 9 | LDPE | 90 | 7.50 | 2.50 | NUCREL 0903 | 51 | 0.197 | — | 9.0 |
| 10 | LDPE | 85 | 11.25 | 3.75 | NUCREL 0903 | 51 | — | — | 3.1 |
| 11 | LDPE | 95 | 5.0 | 0 | — | 51 | 0.540 | — | — |
| 12 | HDPE/LDPE (50/50) | 100 | 0 | 0 | — | 40 | 5 | — | — |
| 13 | HDPE/LDPE (50/50) | 95 | 3.75 | 1.25 | NUCREL 0930 | 40 | 0.62 | — | — |
| 14 | HDPE/LDPE (50/50) | 90 | 7.50 | 2.50 | NUCREL 0903 | 40 | 0.40 | — | — |

What is claimed is:

1. A process for manufacturing a laminar, shaped article of polymeric materials comprising the steps of:
   (a) establishing a melted, heterogeneous blend of
      (i) polyolefin (component (i)),
      (ii) a polyethylene-vinyl alcohol polymer (component (ii)) containing about 20–60 mole % of ethylene units and having a melting point at least about 5° C. higher than the polyolefin, and
      (iii) a compatibilizer chosen from the list consisting of an ethylene-$\alpha,\beta$-ethylenically unsaturated carboxylic acid copolymer, polyethylene-vinyl acetate, a polyethylene vinyl alcohol polymer having a melting point which is less than the melting point of the polyethylene-vinyl alcohol polymer component (ii), and mixtures thereof;
   (b) extending a body of the melt; and
   (c) cooling the extended body to below the melting point of the polyolefin, so as to provide a laminar shaped article wherein the polyethylene-vinyl alcohol polymer component (ii) is present in the article as thin, substantially parallel, overlapping layers of material.

2. The process of claim 1 wherein the melted, heterogeneous blend is established by heating particles of a combination of the polyolefin and the compatibilizer and particles of the polyethylene-vinyl alcohol copolymer, without additional mixing, to a temperature above the melting point of the polyethylene-vinyl alcohol copolymer.

3. The process of claim 1 wherein the polyolefin is polyethylene, polypropylene, or polybutylene homopolymers or copolymers, or mixtures thereof.

4. The process of claim 1 wherein the polyethylene-vinyl alcohol copolymer component (ii) is at least about 99% saponified.

5. The process of claim 1 wherein the polyethylene-vinyl alcohol copolymer component (ii) has a melting point of at least about 10° C. greater than that of the polyolefin.

6. The process of claim 1 wherein the compatibilizer is polyethylene methacrylic acid.

7. The process of claim 1 wherein the quantity of polyolefin is at least about 60% by weight of the blend.

8. The process of claim 7 wherein the amount of polyolefin component (i) is at least about 80 to about 90%, the amount of polyethylene-vinyl alcohol polymer component (ii) is about 2 to about 20%, and the amount of the compatibilizer component (iii) is about 0.5 to about 15% by weight of the mixture of the three components.

9. A laminar article comprising:
   (a) a polyolefin (component (a));
   (b) an polyethylene-vinyl alcohol polymer (component (b)) containing about 20–60 mole % ethylene units and having a melting point at least about 5° C. higher than the polyolefin; and
   (c) a compatibilizer (component (c)) chosen from the list consisting of an ethylene-$\alpha,\beta$-ethylenically unsaturated carboxylic acid copolymer, polyethylene-vinyl acetate, polyethylene-vinyl alcohol polymer having a melting point which is less than the melting point of the polyethylene-vinyl alcohol polymer component (b), and mixtures thereof, wherein the polyethylene-vinyl alcohol polymer component (b) is present in the article as thin, substantially parallel, overlapping layers of material.

10. The laminar article of claim 9 wherein the polyolefin is polyethylene, polypropylene, or polybutylene homopolymers or copolymers, or mixtures thereof.

11. The laminar article of claim 9 wherein the polyethylene-vinyl alcohol copolymer component (b) is at least 99% saponified.

12. The laminar article of claim 9 wherein the polyethylene-vinyl alcohol copolymer component (b) has a melting point of at least about 10° C. greater than that of the polyolefin.

13. The laminar article of claim 9 wherein the compatibilizer component (c) is polyethylene methacrylic acid.

14. The laminar article of claim 9 wherein the quantity of polyolefin component (a) is at least about 60% by weight of the article.

15. The laminar article of claim 9 wherein the amount of polyolefin component (a) is about 60 to about 98%, the amount of ethylene-vinyl alcohol polymer component (b) is about 2 to about 20%, and the amount of the compatibilizer component (c) is about 0.5 to about 15% by weight of the mixture of the three components.

* * * * *